United States Patent
Lynar et al.

(10) Patent No.: US 8,943,361 B2
(45) Date of Patent: Jan. 27, 2015

(54) GEOSPATIAL OPTIMIZATION FOR RESILIENT POWER MANAGEMENT EQUIPMENT

(75) Inventors: Timothy M. Lynar, Carlton Vic (AU); Kent C. Steer, Carlton Vic (AU); John M. Wagner, Carlton Vic (AU)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 13/540,860

(22) Filed: Jul. 3, 2012

(65) Prior Publication Data
US 2014/0013125 A1   Jan. 9, 2014

(51) Int. Cl.
*G06F 11/00* (2006.01)

(52) U.S. Cl.
USPC ................ 714/14; 714/22; 714/47.1

(58) Field of Classification Search
CPC ............ G06F 11/0751; G06F 11/0754; G06F 11/2015; G06F 1/30; G06F 1/305; G06F 1/28
USPC ................ 714/1, 14, 22, 24, 26, 33, 41, 47.1, 714/47.2, 47.3; 713/300, 310, 320, 340
See application file for complete search history.

(56) References Cited

U.S. PATENT DOCUMENTS

| | | | |
|---|---|---|---|
| 5,831,347 A * | 11/1998 | Landis et al. | 714/14 |
| 6,195,754 B1 * | 2/2001 | Jardine et al. | 714/14 |
| 6,304,981 B1 * | 10/2001 | Spears et al. | 714/24 |
| 7,576,517 B1 * | 8/2009 | Cotton et al. | 320/136 |
| 7,844,440 B2 | 11/2010 | Nasle et al. | |
| 8,533,514 B2 * | 9/2013 | Rogers et al. | 714/14 |
| 2012/0265502 A1 * | 10/2012 | Omitaomu et al. | 703/2 |

* cited by examiner

*Primary Examiner* — Joseph D Manoskey
(74) *Attorney, Agent, or Firm* — Tutunjian & Bitetto, P.C.; Vazken Alexanian

(57) ABSTRACT

Methods and apparatus are provided for geospatial optimization for resilient power management equipment. A method includes predicting a power outage duration based on at least one of geographical data, location data, and historical data. The method further includes rendering a power management decision based on the predicted power outage duration and a remaining backup power duration.

22 Claims, 3 Drawing Sheets

GEOSPATIAL OPTIMIZATION FOR RESILIENT POWER MANAGEMENT EQUIPMENT

BACKGROUND

1. Technical Field

The present principles relate generally to power management systems and, in particular, to geospatial optimization for resilient power management equipment.

2. Description of the Related Art

Presently, in server environments utilizing backup power supplies (e.g., uninterruptable power supplies (UPS) or small on-site generators), standard practice is to assume the worst. That is, power will not be restored before the backup power supply is exhausted. Under this assumption, the current practice to avoid an uncontrolled shut down is to power down all systems immediately, which is executed with varying degrees of elegance. Backup power supplies are also selected under this assumed mode of operation in the event of a power outage.

There are a number of limitations with this approach. First, if the systems were providing some service, then time spent offline equates to a decrease in the quality of service and, potentially, compromised revenue (e.g., with respect to web services, cloud computing providers, and so forth). Even in the case where the service has little value during a power failure (since users of the service may also be experiencing power failure), the time required to restore the service can contribute significantly to the duration of the outage. For example, a 15 second power outage could result in 5 minutes of service outage. The second limitation arises from the increased likelihood of device failure during power on. For example, hard drives and other system devices have an increased likelihood of device failure during power on. Thus, in large server environments, each power on can contribute substantially to device failures.

SUMMARY

According to an aspect of the present principles, there is provided a power management method in a power management system. The method includes predicting a power outage duration based on at least one of geographical data, location data, and historical data. The method further includes rendering a power management decision based on the predicted power outage duration and a remaining backup power duration.

According to another aspect of the present principles, there is provided a power management apparatus in a power management system. The apparatus include a power outage parameter predictor for predicting a power outage duration based on at least one of geographical data, location data, and historical data. The apparatus further includes a power management decision device for rendering a power management decision based on the predicted power outage duration and a remaining backup power duration.

According to yet another aspect of the present principles, there is provided a power management method in a power management system. The method includes predicting a power outage duration based on geographical data, location data, and historical data. The method further includes rendering a power management decision based on the predicted power outage duration and a remaining backup power duration. The power management decision is selected from at least initiating a switch to a power backup mode when the predicted power outage duration is less than the remaining backup power duration, and initiating a power shut down mode when the predicted power outage duration is greater than the remaining backup power duration.

According to still another aspect of the present principles, there is provided a power management apparatus in a power management system. The apparatus includes a power outage parameter predictor for predicting a power outage duration based on geographical data, location data, and historical data. The apparatus further includes a power management decision device for rendering a power management decision based on the predicted power outage duration and a remaining backup power duration. The power management decision is selected from at least initiating a switch to a power backup mode when the predicted power outage duration is less than the remaining backup power duration, and initiating a power shut down mode when the predicted power outage duration is greater than the remaining backup power duration These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to geospatial optimization for resilient power management equipment. As noted above, the power management system in computing environments which include a backup power supply can be programmed to send shut down commands to devices, systems and services running within that environment based on the detection of power anomalies (e.g., black outs or brown outs). We disclose a method for augmenting such a system by utilizing geographically relevant statistical information on power events. This information can be used to predict the duration and frequency of power anomalies, which, in turn, can be used to render or influence decisions regarding a shut down sequence. In an embodiment, we switch to backup power in the case when the predicted power outage duration is less than the remaining backup power duration. Moreover, in an embodiment, we perform a shut down in the case when the predicted power outage duration is more than the remaining backup power duration.

The geographical position or location within the power grid of a computing environment can be a good predictor of the duration or frequency of power interruptions. In an embodiment, we utilize a model of power interruption (including, but not limited to, the modeling of power interruption duration and frequency) that incorporates geographical, location or additional information to assist a power management system in the optimization of power management decisions, particularly those decisions made as a result of a power interruption. For example, if a power management system could accurately estimate the duration of a power outage then it could better evaluate the value of powering down equipment. Any additional information that can be gained provides a more accurate model of power interruption and thus reduces risk. This additional information could come from, but is not limited to, global positioning systems or communication networks, or even manually entered information. Therefore, if estimates of the duration of a power outage are available, and it is known how long the devices can operate using the backup power supply, then some system shut downs can be avoided.

Figure 1:
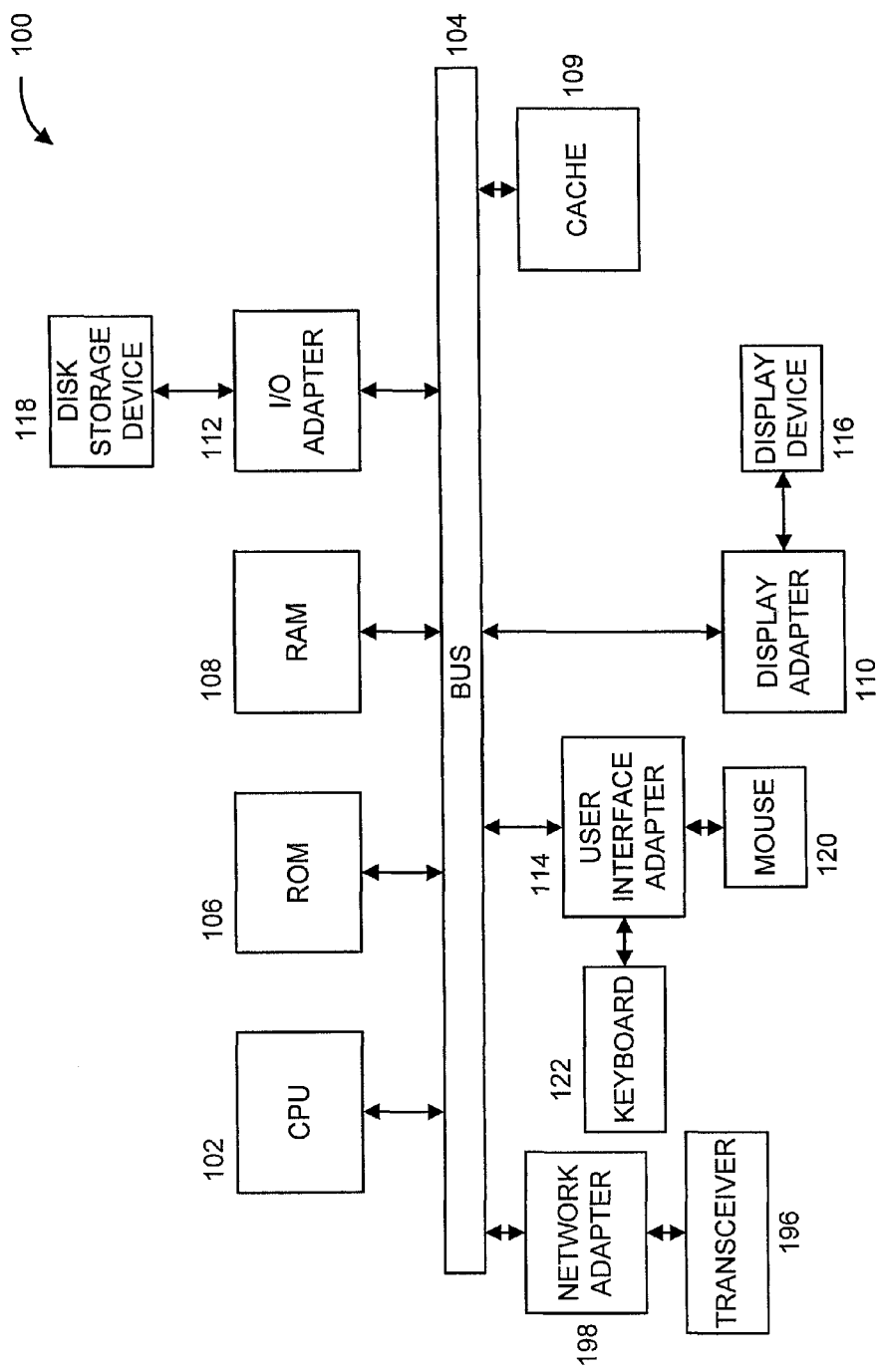
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 102 operatively coupled to other components via a system bus 104. A read only memory (ROM) 106, a random access memory (RAM) 108, a display adapter 110, an I/O adapter 112, a user interface adapter 114, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keyboard 122 are operatively coupled to system bus 104 by user interface adapter 214. The mouse 120 and keyboard 122 are used to input and output information to and from system 100.

A transceiver 196 is operatively coupled to system bus 104 by network adapter 198.

Figure 2:
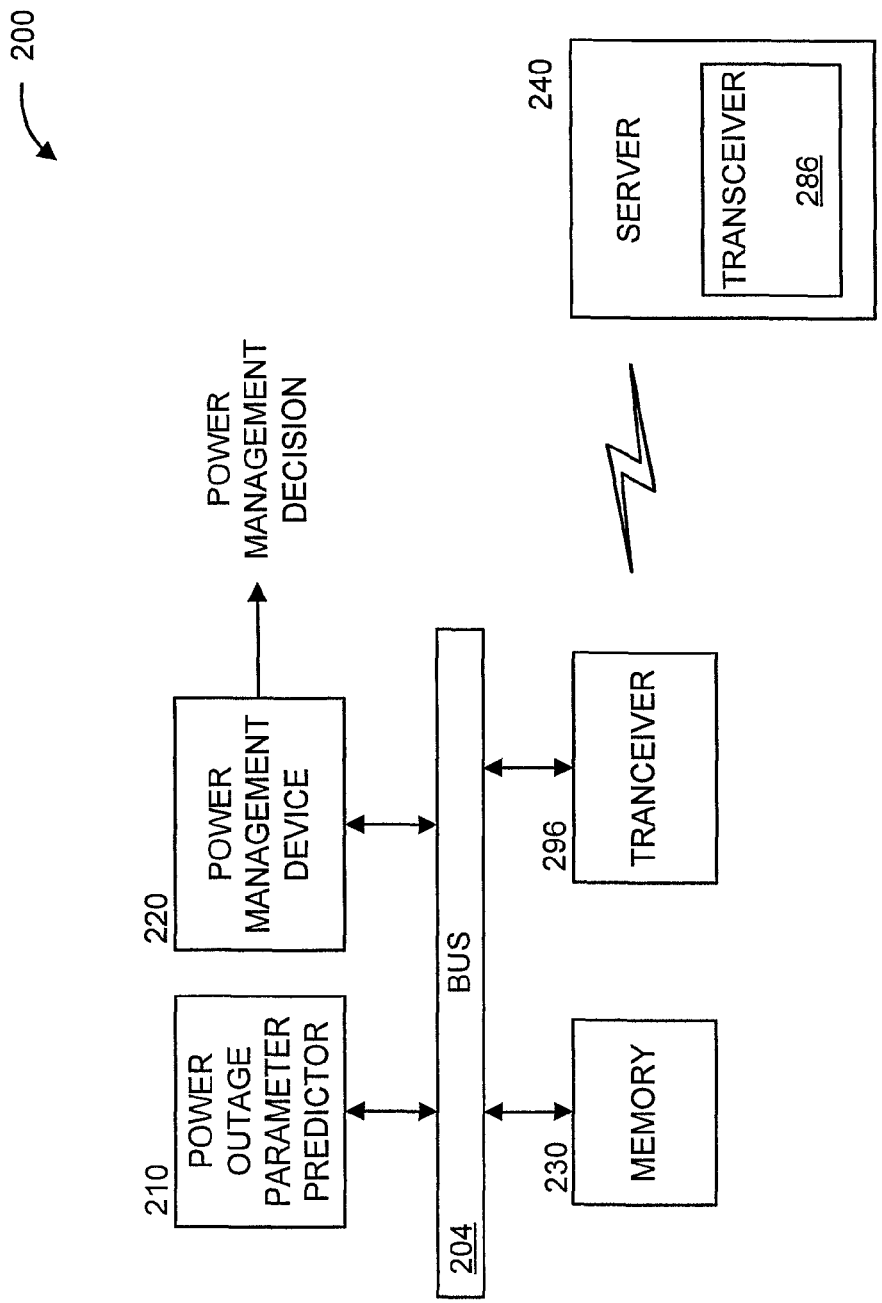
FIG. 2 shows an exemplary system 200 for geospatial optimization for resilient power management equipment, in accordance with an embodiment of the present principles.

Of course, the processing system 100 may also include other elements (not shown), as readily contemplated by one of skill in the art, as well as omit certain elements. For example, system 200 described below with respect to FIG. 2 is a system for implementing a respective embodiment of the present principles. Part or all of processing system 100 may be implemented in one or more of the elements of system 200. In such a case, the transceiver 196 may be replaced by a transmitter or a receiver depending upon the element the processing system 100 or portion thereof is implemented in, connected to, and/or otherwise somehow involved with, as readily contemplated and understood by one of ordinary skill in the art, given the teachings of the present principles provided herein. Thus, when used herein, the term "transceiver" may be replaced by "transmitter" or "receiver" depending on the specific implementation. As examples, in an embodiment, the remote server 240 and the power outage parameter predictor 210 described below with respect to FIG. 2 may communicate with each other using wireless technology. Moreover, in an embodiment, the power management device 220 may simply communicate a shut down command wirelessly to another device (e.g., a switch) capable of actually implementing the same. Of course, wired connections may also be used. These and other implementations of the present principles are readily contemplated by one of ordinary skill in the art given the teachings of the present principles provided herein, while maintaining the spirit of the present principles.

Additionally, elements of processing system 100 such as the keyboard 122 and mouse 120 may be omitted with a user interfacing with the processing system via the transceiver 196 and/or display device 116.

These and other variations of processing system 100 and the elements included therein are readily contemplated by one of ordinary skill in the art, while maintaining the spirit of the present principles.

Figure 3:
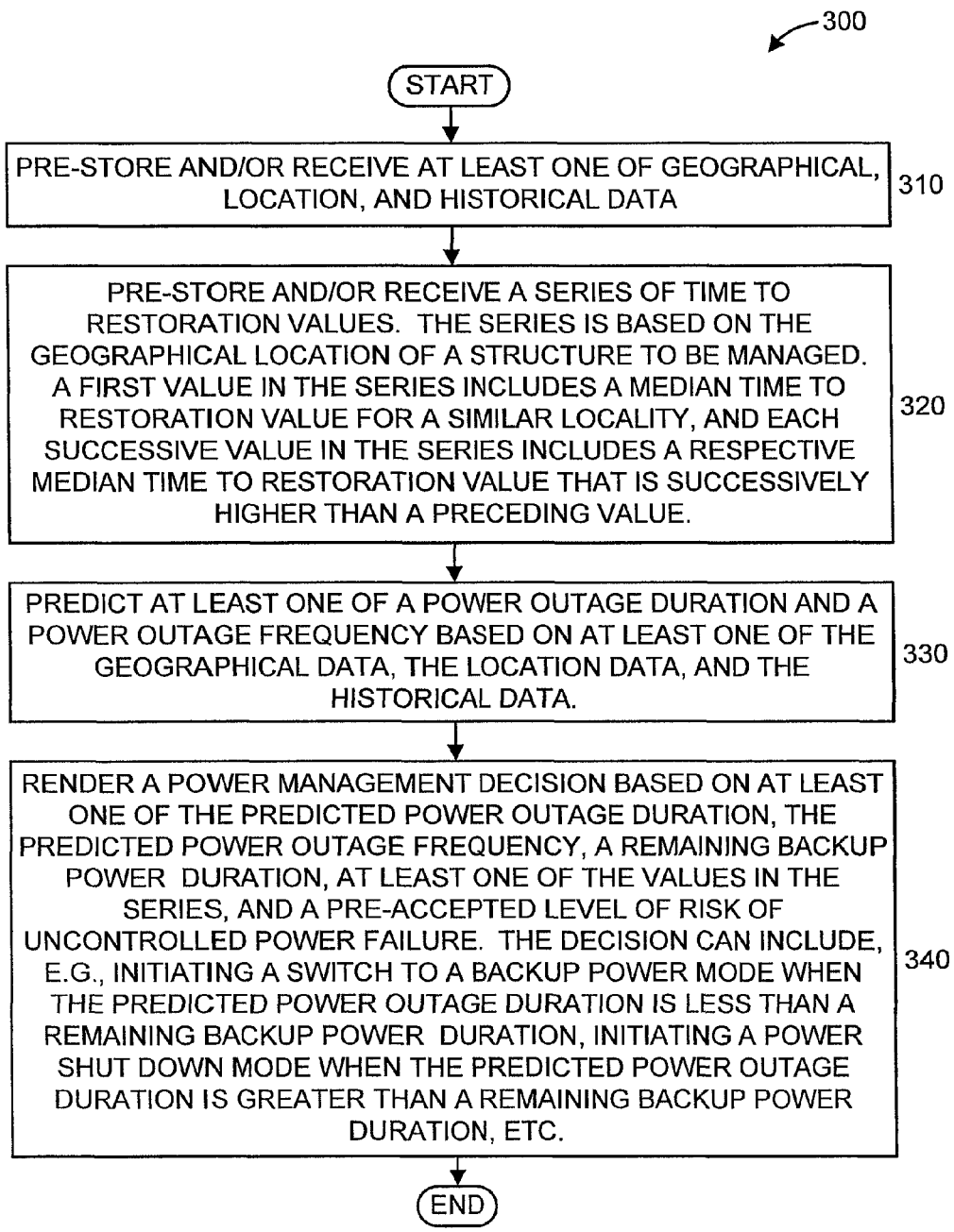
FIG. 3 shows an exemplary method 300 for geospatial optimization for resilient power management equipment, in accordance with an embodiment of the present principles.

Moreover, it is to be appreciated that processing system 100 may perform at least part of the methods described herein including, for example, parts of method 300 of FIG. 3.

FIG. 2 shows an exemplary system 200 for geospatial optimization for resilient power management equipment, in accordance with an embodiment of the present principles. The system 200 includes a power outage parameter predictor 210, a power management device 220, a local memory 230, and a remote server 240.

In the embodiment of FIG. 2, the power outage parameter predictor 210, the power management device 220, and the local memory 230 are interconnected using a system bus 204 which is also connected to a transceiver 296 that communicates with a transceiver 286 in the remote server 240. Of course, other configurations and communication technologies may also be used. For example, the bus 204 may be connected to a network adapter that in turn is connected to the remote server through a wired network such as, but not limited to the Internet (or, preferably a more secure network) or can be connected through one or more networks including wired and wireless networks. Further, in another embodiment, the server 240 may be included within system 200, and be used to communicate with other remote power management systems and/or devices to be controlled by the same. These and other variations and implementations are readily contemplated by one of ordinary skill in the art given the teachings of the present principles provided herein, while maintaining the spirit of the present principles.

It is to be appreciated that in an embodiment, at least the power outage parameter predictor 210 and the power management device 220 each include or share a processor and a memory in order to perform their corresponding functions.

The local memory 230 stores at least one of geographical data, location data, historical data, a series of time to restoration values (as described in further detail herein below), a set of values representing successive pre-accepted levels of risk (as described in further detail herein below), and so forth. The local memory 230 can also store at least one of a predicted power outage duration, a predicted power outage frequency, and a remaining backup power duration. The values stored in local memory 230 can be prior values and/or currently determined values for a local location or a remote location with respect to a particular item or location whose power is to be managed. Hence, a previous actual power outage duration and/or frequency can serve as a respective current prediction for the same. Hence, in an embodiment, the historical data can be prior geographical and/or location data (and/or other data).

The remote server 240 stores and provides at least one of the geographical data, location data, historical data to the power outage parameter predictor 210, and can also store and provide any of the values that are stored in the local memory 230 and/or other values. The values stored in the remote server 240 can be prior values and/or currently determined values for a local location or a remote location with respect to a particular item or location whose power is to be managed. Hence, in an embodiment, the historical data can be prior geographical and/or location data (and/or other data).

The power outage parameter predictor 210 predicts at least one of a power outage duration and a power outage frequency based on at least one of the geographical data, the location data, and the historical data. The power outage duration that is predicted can be of a future power outage or a current power outage.

The power management device 220 renders a power management decision based on at least one of the predicted power outage duration, the predicted power outage frequency, a remaining backup power duration, at least one of the values in the series, and a pre-accepted level of risk of uncontrolled power failure (e.g., selected from a set of values representing successive pre-accepted levels of risk). Of course, given the teachings of the present principles provided herein, other items may be considered by the power management device 220 in rendering the power management decision, while maintaining the spirit of the present principles.

It is to be appreciated that in some embodiment, the power management device 220 may be enabled structurally and functionally to implement the power management decision on its own. For example, the power management device 220 may be part of or directly connected to a switch, and/or so forth. However, in other embodiments, the power management device 220 may provide its decision to another device (e.g., a switch, etc.) which may then implement the power management decision. While the power management decision is shown directly output from the power management device 220, it may be provided to a remote location or device through the transceiver 296 and/or through a wired connection. These and other ways in which to implement the power management decision are readily determined by one of ordinary skill in the art, given the teachings of the present principles provided herein, while maintaining the spirit of the present principles.

It is to be appreciated that system 200 may perform at least part of the methods described herein including, for example, parts of method 300 of FIG. 3.

FIG. 3 shows an exemplary method 300 for geospatial optimization for resilient power management equipment, in accordance with an embodiment of the present principles.

At step 310, at least one of geographical data, location data, and historical data is pre-stored (e.g., in memory 230 and/or server 240) and/or is received (e.g., from server 240, e.g., responsive to a detected power anomaly event). The pre-stored data can be, e.g., previously received data from the server 240 and used to predict a power outage duration and/or a power outage frequency when the server experiences the detected power anomaly event or another power anomaly event.

At step 320, a series of time to restoration values is pre-stored (e.g., in memory 230 and/or server 240) and/or is received (e.g., from server 240). The series is based on the geographical location of a structure to be managed by the power management method. A first value in the series includes a median time to restoration value for a similar locality with respect to the geographical location of the structure, and each successive value in the series includes a respective median time to restoration value that is successively higher than a preceding value in the series.

At step 330, at least one of a power outage duration and a power outage frequency is predicted (by the power outage parameter predictor 210) based on at least one of the geographical data, the location data, and the historical data.

At step 340, a power management decision is rendered (by the power management device 220) based on at least one of the predicted power outage duration, the predicted power outage frequency, a remaining backup power duration, at least one of the values in the series, and a pre-accepted level of risk of uncontrolled power failure (e.g., selected from a set of values representing successive pre-accepted levels of risk). The remaining backup power duration can include, for example, a safety margin. The power management decision can include, for example, initiating a switch to a power backup mode when the predicted power outage duration is less than a remaining backup power duration, initiating a power shut down mode when the predicted power outage duration is greater than a remaining backup power duration, and so forth.

In an embodiment, a revision of an existing power management method or system within an existing power management system is implemented. The method or system could periodically poll electricity network information from a remote server.

In the event of a power anomaly (which existing systems can detect directly by monitoring the power supply) the system could request information from the remote server. It is noted that the power anomaly in question could cause this request to fail, in which case the system would rely on previously received information.

Having detected the power anomaly, the system could then analyze the power requirements for the various systems and services currently operating in that computing environment. Then, with knowledge of the available stored energy, the system can estimate how much longer current operations can continue (time=stored energy/required power). If the time until the power is restored is likely to be less than the possible operating time from stored energy, then it may be advantageous to continue operating (i.e., not initiate the shut down sequence).

Such a process could be performed iteratively, such that the system is continually obtaining more up-to-date information on the time-to-restoration, the available stored energy, and the processes currently operating (some may have already shut down).

In order to avoid an uncontrolled shut down, the calculation of time remaining should include a safety margin in which the systems could be powered down.

The above described embodiment is presented in pseudocode as follows:

```
begin loop
    if connection exists with remote server then
        update local electricity network information
    end if
    while power outage has been detected do
        update total power requirement for operating services
        update total energy in local storage (e.g., UPS)
        update shut down sequence duration for operating services
        if connection exists with remote server then
            update local electricity network information
        end if
        update time-to-restoration estimate and acceptable error
            available time = total energy / total power - shut down sequence duration
            if available time is less than time-to-restoration + acceptable error
            then
                initiate shut down sequence
                break from while loop
            end if
    end while
end loop
```

A description of a preferred embodiment will now be given. The preferred embodiment will operate as follows. However, given the teachings of the present principles provided herein, variations to such embodiment can be readily made by one of ordinary skill in the art, while maintaining the spirit of the present principles.

The power management system would have stored a series of time to restoration R values, e.g., $R_1, R_2, R_3, \ldots$, based on the geographical location of the building B. In this embodiment, $R_1$ is the median time to power restoration following a power outage in a locality similar to location B, $R_2$ is the median time until power restoration when the time taken to restore power is $>R_1$, $R_3$ is the median time until power restoration when the time taken to restore power is greater than $R_2$, and so forth. Assuming that the power to a building at location X went out at time $T_0$ and that there is a battery that has a store of energy J, and the building has a number of computers that consume a mean total power of W, then the maximum time that all the computers could remain on $T_{max}$ in building B is J/W. Given the responsible entities' acceptance of risk for uncontrolled shut down Q and a function E(.) which estimates the time we are willing to wait at time T, for our given choice of Q, then the following algorithm can be applied:

```
while T_max > E(Q, T-T_0, R_1, R_2, R_3,...) do
    Do not shut down power dependent services
end while
if power has not been restored
    shut down all power dependent services
end if
```

As will be appreciated by one skilled in the art, aspects of the present principles may be embodied as a system, method or computer program product. Accordingly, aspects of the present principles may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present principles may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present principles may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present principles are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present principles. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A power management method in a power management system, comprising:
   predicting a power outage duration based on at least one of geographical data, location data, and historical data; and
   rendering a power management decision based on the predicted power outage duration and a remaining backup power duration; and
   storing a series of time to restoration values based on the geographical location of a structure to be managed by the power management method, wherein a first value in the series comprises a median time to restoration value for a similar locality with respect to the geographical location of the structure, and each successive value in the series comprises a respective median time to restoration value that is successively higher than a preceding value in the series, wherein a power shut down decision is rendered based on at least one of the values in the series.

2. The power management method of claim 1, wherein said rendering step comprises initiating a switch to a power backup mode when the predicted power outage duration is less than the remaining backup power duration.

3. The power management method of claim 1, wherein said rendering step comprises initiating a power shut down mode when the power outage duration is greater than the remaining backup power duration.

4. The power management method of claim 1, further comprising predicting a power outage frequency based on at least one of the geographical data, the location data, and the historical data.

5. The power management method of claim 1, further comprising receiving the at least one of the geographical data, the location data, and the historical data from a remote server.

6. The power management method of claim 5, wherein the at least one of the geographical data, the location data, and the historical data is received from the remote server responsive to a detected power anomaly event.

7. The power management method of claim 6, wherein previously received data from the server is used to predict the power outage duration when the server experiences the detected power anomaly event or another power anomaly event.

8. The power management method of claim 1, wherein the remaining backup power duration comprises a safety margin.

9. The power management method of claim 1, wherein the power shut down decision is rendered further based on a pre-accepted level of risk of uncontrolled power failure.

10. The power management method of claim 9, further comprising selecting the pre-accepted level of risk from a set of values representing successive pre-accepted levels of risk.

11. A power management apparatus in a power management system, comprising:
    a power outage parameter predictor for predicting a power outage duration based on at least one of geographical data, location data, and historical data; and
    a power management decision device having a processor for rendering a power management decision based on the predicted power outage duration and a remaining backup power duration; and
    a memory device for storing a series of time to restoration values based on the geographical location of a structure to be managed by the power management apparatus, wherein a first value in the series comprises a median time to restoration value for a similar locality with respect to the geographical location of the structure, and each successive value in the series comprises a respective median time to restoration value that is successively higher than a preceding value in the series, wherein the power management decision device renders a power shut down decision based on at least one of the values in the series.

12. The power management apparatus of claim 11, wherein said power management decision device initiates a switch to a power backup mode when the predicted power outage duration is less than the remaining backup power duration.

13. The power management apparatus of claim 11, wherein said power management decision device initiates a power shut down mode when the predicted power outage duration is greater than the remaining backup power duration.

14. The power management apparatus of claim 11, wherein said power outage parameter predictor predicts a power outage frequency based on at least one of the geographical data, the location data, and the historical data.

15. The power management apparatus of claim 11, further comprising a memory device for providing the at least one of the geographical data, the location data, and the historical data to the power outage parameter predictor.

16. The power management apparatus of claim 11, wherein the memory is located proximate to the power outage parameter predictor or is located remote with respect to the power outage parameter predictor.

17. The power management apparatus of claim 11, wherein the power management decision device renders the power shut down decision further based on a pre-accepted level of risk of uncontrolled power failure.

18. The power management apparatus of claim 17, further comprising a memory for storing a set of values representing successive pre-accepted levels of risk from which the pre-accepted level of risk used for the power shut down decision is selected.

19. A power management method in a power management system, comprising:
    predicting a power outage duration based on geographical data, location data, and historical data;
    rendering a power management decision based on the predicted power outage duration and a remaining backup power duration; and
    storing a series of time to restoration values based on the geographical location of a structure to be managed by the power management method wherein a first value in the series comprises a median time to restoration value for a similar locality with respect to the geographical location of the structure and each successive value in the series comprises a respective median time to restoration value that is successively higher than a preceding value in the series, wherein a power shut down decision is rendered based on at least one of the values in the series,
    wherein the power management decision is selected from at least initiating a switch to a power backup mode when the predicted power outage duration is less than the remaining backup power duration, and initiating a power shut down mode when the predicted power outage duration is greater than the remaining backup power duration.

20. The power management method of claim 19, further comprising predicting a power outage frequency based on at least one of the geographical data, the location data, and the historical data.

21. A power management apparatus in a power management system, comprising:
    a power outage parameter predictor for predicting a power outage duration based on geographical data, location data, and historical data; and
    a power management decision device having a processor for rendering a power management decision based on the predicted power outage duration and a remaining backup power duration; and
    a memory device for storing a series of time to restoration values based on the geographical location of a structure to be managed by the power management method, wherein a first value in the series comprises a median time to restoration value for a similar locality with respect to the geographical location of the structure, and each successive value in the series comprises a respective median time to restoration value that is successively higher than a preceding value in the series wherein the power management decision device renders the power management decision based on at least one of the values in the series,
    wherein the power management decision is selected from at least initiating a switch to a power backup mode when the predicted power outage duration is less than the remaining backup power duration, and initiating a power shut down mode when the predicted power outage duration is greater than the remaining backup power duration.

22. The power management apparatus of claim 21, wherein said power outage parameter predictor predicts a power outage frequency based on at least one of the geographical data, the location data, and the historical data.

* * * * *